United States Patent
Patten et al.

(10) Patent No.: US 8,184,811 B1
(45) Date of Patent: May 22, 2012

(54) MOBILE TELEPHONY CONTENT PROTECTION

(75) Inventors: Christopher Patten, Roeland Park, KS (US); Michael Williams, Raymore, MO (US); Roy Joseph, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 1213 days.

(21) Appl. No.: 11/248,689

(22) Filed: Oct. 12, 2005

(51) Int. Cl.
 *H04K 1/00* (2006.01)
 *G06F 21/00* (2006.01)

(52) U.S. Cl. ........ 380/247; 713/189; 713/170; 380/229; 380/270

(58) Field of Classification Search .................. 380/3, 4, 380/200, 201, 270, 247; 713/160, 154, 153; 714/1, 15, 18; 726/17, 21, 28–30; 370/395.32
See application file for complete search history.

(56) References Cited

U.S. PATENT DOCUMENTS

| | | | |
|---|---|---|---|
| 6,912,275 B1* | 6/2005 | Kaplan | 379/88.2 |
| 6,934,463 B2* | 8/2005 | Ishiguro et al. | 386/94 |
| 6,952,836 B1* | 10/2005 | Donlan et al. | 725/116 |
| 7,315,950 B1* | 1/2008 | Baransky et al. | 713/193 |
| 7,356,838 B2* | 4/2008 | Madison et al. | 726/10 |
| 7,421,411 B2 | 9/2008 | Kontio et al. | |
| 7,711,942 B2* | 5/2010 | Wang et al. | 713/2 |
| 7,895,437 B2* | 2/2011 | Ganesan et al. | 713/171 |
| 2003/0120940 A1* | 6/2003 | Vataja | 713/193 |
| 2003/0133576 A1* | 7/2003 | Grumiaux | 380/279 |
| 2003/0233329 A1* | 12/2003 | Laraki et al. | 705/52 |
| 2004/0003241 A1* | 1/2004 | Sengodan et al. | 713/168 |
| 2004/0153642 A1* | 8/2004 | Plotkin et al. | 713/150 |
| 2004/0158707 A1 | 8/2004 | Kim | |
| 2005/0076210 A1* | 4/2005 | Thomas et al. | 713/165 |
| 2005/0097348 A1* | 5/2005 | Jakubowski et al. | 713/200 |
| 2005/0113070 A1* | 5/2005 | Okabe | 455/411 |
| 2005/0207578 A1* | 9/2005 | Matsuyama et al. | 380/231 |
| 2005/0209972 A1* | 9/2005 | Bjorkengren et al. | 705/57 |
| 2005/0239447 A1* | 10/2005 | Holzman et al. | 455/414.3 |
| 2006/0253713 A1 | 11/2006 | Terranova et al. | |
| 2007/0150735 A1* | 6/2007 | Futa et al. | 713/171 |
| 2007/0288743 A1* | 12/2007 | Cam-Winget et al. | 713/150 |

OTHER PUBLICATIONS

U.S. Appl. No. 11/121,522, filed May 4, 2005.
Office Action from U.S. Appl. No. 11/121,522, dated Jan. 28, 2009.
Office Action from U.S. Appl. No. 11/121,522, dated Sep. 2, 2009.

* cited by examiner

*Primary Examiner* — Taghi Arani
*Assistant Examiner* — Mohammad Rahman

(57) ABSTRACT

In a digital content management system, a mobile device determines whether it is authorized to use digital content by sending, to a service provider, a hash value that has been pre-stored in the mobile device and that is associated with the digital content. The hash value is generated by combining a user identifier, among other data, into a combined hash. The other data included in the combined hash may be, for example, a service provider key unknown to the user, and a hash of the protected content. A telecommunications service provider, such as a service provider of a CDMA wireless network, determines whether the hash value is valid and, accordingly, whether the mobile device is authorized to use the digital content.

8 Claims, 4 Drawing Sheets

MOBILE TELEPHONY CONTENT PROTECTION

BACKGROUND

The present invention relates to digital rights management, particularly the management of rights in digital content for use in a mobile telephony device.

The market for mobile telecommunications services has become increasingly competitive. To provide additional sources of revenue, some telecommunications service providers sell or license digital content for use on mobile devices, such as mobile telephones. Ring tones, screen savers, and games are just three examples of such digital content, which authorized subscribers can pay to use on their respective mobile devices.

Digital content, however, is notoriously simple to copy and disseminate. Each unauthorized copy of the content diverts customers from the authorized product and cuts into the service provider's revenue stream. As a result, it is desirable to implement a digital rights management system in the mobile device.

Because mobile devices often have less computing power than personal computers, it is further desirable to implement such a digital rights management system that compensates for the limited resources of the mobile device.

SUMMARY

In a content management system, a mobile device determines whether it is authorized to use digital content by sending, to a service provider, a hash value that has been pre-stored in the mobile device and that is associated with the digital content.

The hash value had been generated by combining a user identifier, among other data, into a combined hash. The other data included in the combined hash may be, for example, a service provider key unknown to the user, and a hash of the protected content.

The service provider key determines whether the combined hash is valid. It may do this by generating a benchmark hash from the data used to generate the combined hash originally (such as the user identifier, the service provider key, and a hash of the protected content). The service provider then compares the benchmark hash with the combined hash submitted by the mobile device to determine whether the submitted hash is valid. The service provider reports its results to the mobile device, which determines whether the user is permitted to use the content.

DETAILED DESCRIPTION

I. Overview of an Embodiment

Figure 1:
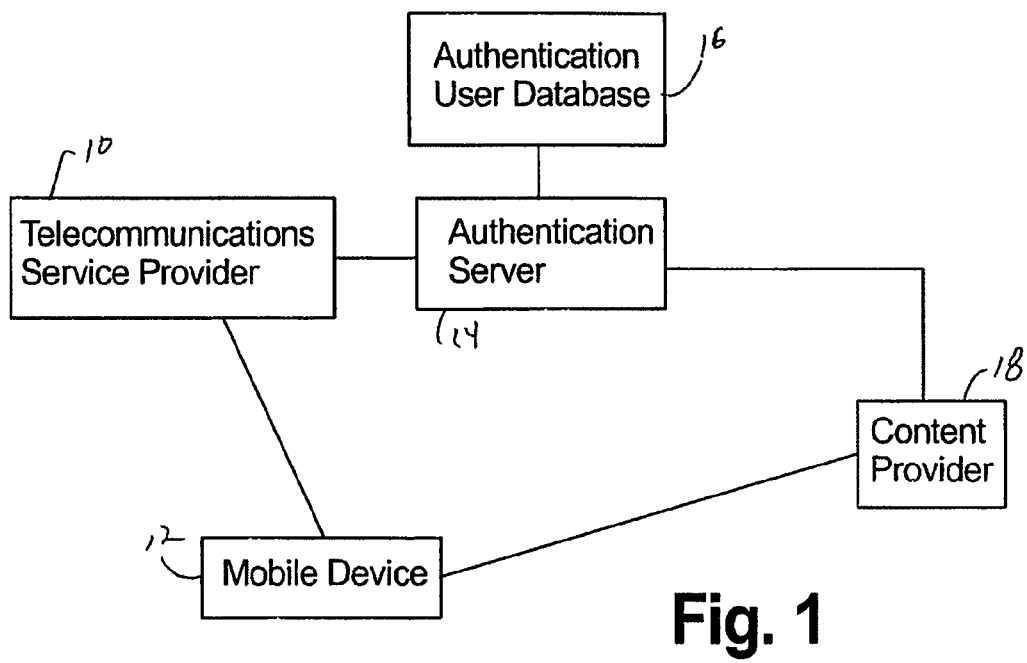
FIG. 1 is a block diagram of the architecture of a digital rights management system.

In a mobile telephony digital rights management system, a user is provided with a mobile device, such as a mobile telephone in a CDMA network, that is capable of using digital content such as a ring tone, a screen saver, an audio file, or game software. The device is serviced by a telecommunications service provider, such as a mobile telephony service provider.

Each mobile device is identified by a user identifier, which may be an electronic serial number, a telephone number, or other identifier. The user identifier is stored in a database by the service provider.

The service provider is responsible for providing managed content to the user's mobile device. In providing the content to the mobile device, the service provider generates a hash value from the content (the "content hash value"). The service provider also generates a key value that is kept secret from the user. Based on the content hash value, the user identifier, and the key, the service provider generates a combined hash value. This combined hash is delivered to the user's mobile device at the time the content is purchased (or otherwise registered). In some cases, the combined hash may be delivered to the mobile device during provisioning of the device.

Before making use of the managed content, the mobile device sends the combined hash value to the service provider. Based on the combined hash value, the service provider determines whether the user is authorized to use the content. The service provider responds to the mobile device with a message indicating whether the user is authorized to use the content. If so, the mobile device permits the user to make use of the content. Otherwise, the user is denied access to the content.

In the case of a mobile device that uses a hard-coded form of identification, such as an electronic serial number, it can be very difficult for a mobile device to "spoof," or fake, a different user identifier in transactions with the service provider. Because the user identifier is used in creating the combined hash value, the service provider will be able to determine whether an unauthorized user is attempting to use a different, authorized user's hash value.

Moreover, because users are not provided with the content provider's key value, an unauthorized user cannot generate a valid combined hash value, even using his own user identifier and even if he generates the correct content hash value.

The service provider, on the other hand, has access to the correct content hash value, to the user identifier, and to the key, so the service provider can generate a valid combined hash value. Notably, because the service provider can generate a combined hash value from this information, while an unauthorized user cannot, the service provider need not access a (potentially sizeable) database of authorized content users each time a mobile device requests authentication. This feature, if implemented, can be used to allow rapid discrimination between authorized and unauthorized users and, as a result, can make the digital rights management system less intrusive to authorized users.

II. Authentication Architecture

In a preferred embodiment, the digital rights management system is implemented in a mobile telephone network, such as a CDMA network operated by a mobile telecommunications service provider.

As illustrated in FIG. 1, a digital rights management system includes a telecommunications service provider 10 is in wireless communication with a mobile device 12, which may be one of numerous mobile telephones served by the telecommunications service provider. A user of mobile device 12 may make wireless telephone calls through the telecommunications service provider 10. In addition, mobile device 12 operates to make use of content protected by the digital rights management system. Such content can include, for example, a game, a screen saver, a ring tone, or an audio file.

The content may be delivered to the mobile device by the service provider itself, or by an outside provider, such as a content provider 18. In either case, the content may be delivered over the wireless network (during mobile telephone provisioning, for example), or by other means, such as a "hot synch" local connection with a computer.

III. Generating the Combined Hash Value

Figure 2:
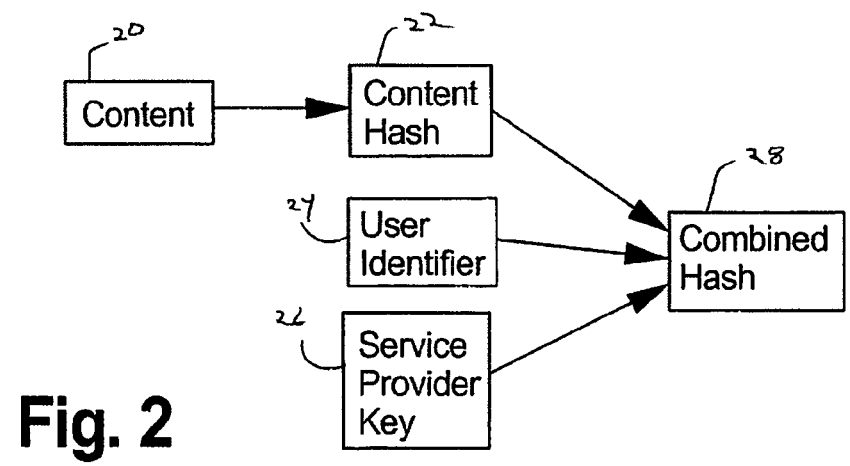
FIG. 2 is a schematic diagram illustrating a two-stage hashing process for use with the digital rights management system.

The digital rights management system makes use of a combined hash value. The components of one type of combined hash value are illustrated schematically in FIG. 2. In this technique, the content 20 is "hashed" (i.e., supplied as the input to a hash function) to generate a content hash value 22. The content hash 22 is combined with a user identifier 24 and a key 26, and the combined data is hashed to form a combined hash 28. This combination may be undertaken in one of several ways, including, but not limited to, concatenation, superposition with XOR, or other techniques. In one embodiment, the user identifier 24 and the service provider key 26 are hashed together, and the result is hashed with the content hash 22 to form the combined hash 28.

The user identifier may be, for example, an electronic serial number of the mobile device 12 (FIG. 1), it may be the exchange telephone number of the mobile device 12, or it may be other identifying information, such as an account number of the user, or a SIP address of the user. As an alternative, the user identifier may include a combination of one or more pieces of identifying information (including those listed above and/or others). The user identifier may be, but is not necessarily, unique to a human user (e.g., a social security number). As an alternative, the user identifier may be, but is not necessarily, unique to the mobile device (e.g., an electronic serial number). Where the user identifier is unique to the mobile device, a user may have more than one mobile device, each corresponding to its own user identifier. In another alternative, a user identifier such as an account number may be shared by more than one mobile device.

The key may be, but need not be, unique for the user. In one embodiment, the key may itself be generated from a user identifier. For example, it may be a hash of the user identifier (alone or together with other information), it may be the result of signing the user identifier with a private key of the service provider, or it may otherwise be generated from the user identifier. In an alternative, the key is created by a pseudorandom number generator. The key 26 is preferably known only to the telecommunications service provider and/or the authentication server, and not to the users. For example, the key is not stored on the mobile device 12.

Any one or more of several known hash algorithms may be used to generate the content hash 22 and the combined hash 28. Appropriate hash algorithms include MD5 and SHA-1. In embodiments in which more than one hashing step is used, different hashing algorithms can be used in different steps.

IV. An Exemplary Authentication Method: Mobile Device Side

Figure 3:
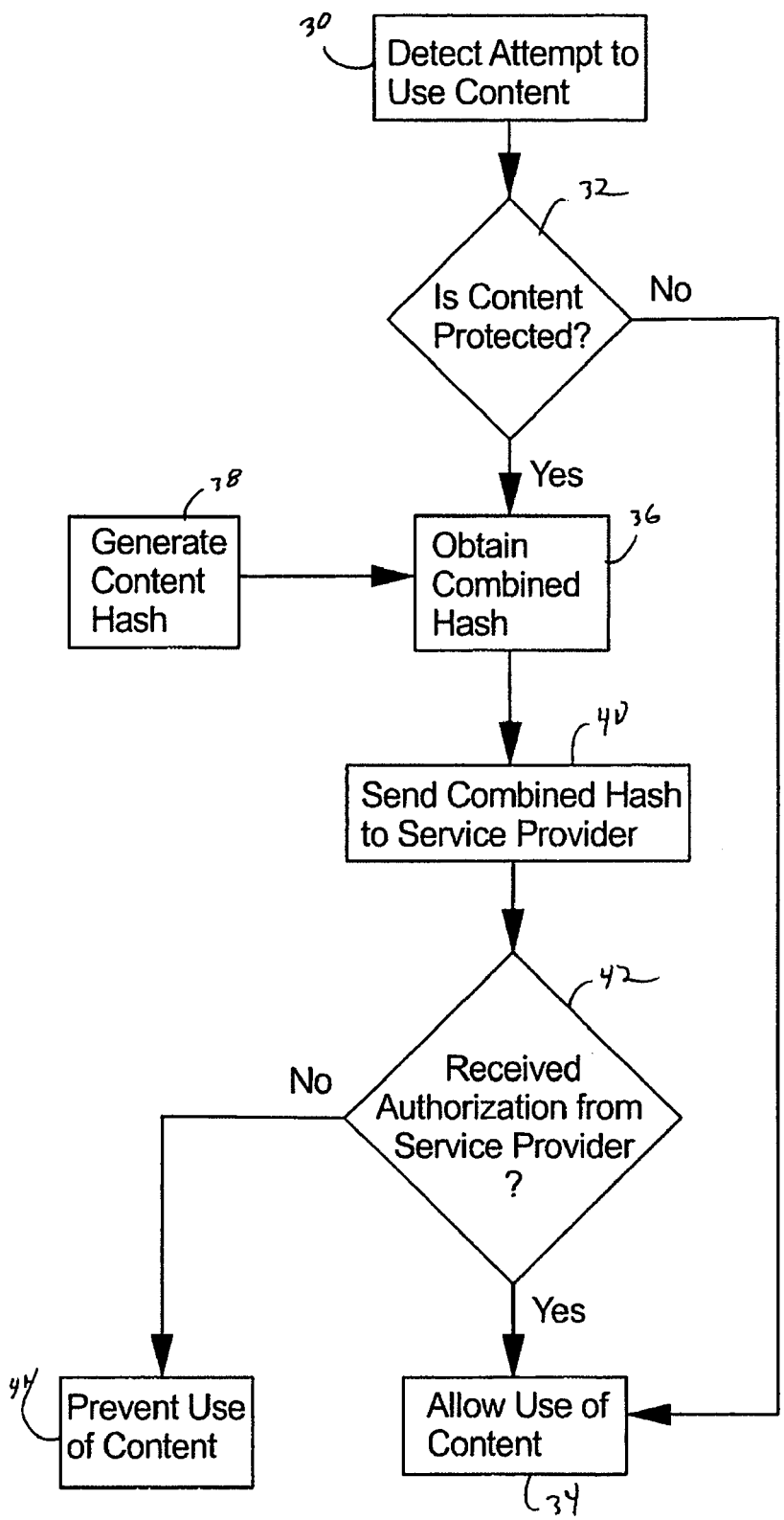
FIG. 3 is a flow diagram illustrating a method performed by a mobile device in a digital rights management system.

One possible method for implementing a digital rights management at a mobile device is illustrated in FIG. 3. In step 30, the mobile device detects an attempt to use content. The attempt to use content may be, for example, an attempt to open, execute, load, and/or play a file or other resource. It mobile device then determines in step 32 whether the content is protected by the digital rights management system. This determination may be made by, for example, consulting a flag associated with the content that is set (or clear) depending on whether (or not) the content is protected. Alternatively, this determination may be made by consulting a database or other data structure identifying protected content.

In a preferred embodiment, the mobile device is capable of using both protected content (which requires authentication) and unprotected content (which does not). When an attempt is made to access content (by loading a screen saver or ring tone, by playing an audio file, or by executing game software, for example) the authentication logic determines whether the content is protected content and, if so, carries out the required authentication.

If the content is not protected, then the mobile device allows the content to be used in step 34 (e.g., executed, opened, played, displayed, or loaded, as appropriate). If, however, the content is protected, the system determines whether the user is authorized to use the content. To do this, the mobile device obtains the associated content hash in step 36. The manner by which it obtains the hash may differ in different embodiments. For example, in one embodiment, the combined hash is stored on the mobile device in a completed form. In such an embodiment, the mobile device may store a plurality of combined hashes, indexed by information identifying the content, so that the correct combined hash can be selected based on the identity of the content.

In another embodiment in which the combined hash is not itself stored on the mobile device, the combined hash may be generated from other information at the mobile device. For example, the mobile device may store a hash of the user identifier and service provider key (without having the service provider key itself). To generate the combined hash (step 38), the mobile device generates a hash of the content and then generates a combined hash of the content hash with the stored hash.

In step 40, the mobile device sends the combined hash to the service provider and/or authentication server over a wireless connection. The mobile device awaits a response. If (step 42) the mobile device receives authorization from the service provider and/or authentication server, the mobile device allows use of the content (step 34). Alternatively, if authorization is not received and/or if the mobile device receives a response indicating that the user is not authorized, then the mobile device prevents the use of the content (step 44).

In various embodiments, steps 34 and 44 may be performed in different ways. For example, to accommodate any delays in receiving approval from a service provider, use of the content may be allowed for a period of time, such as 30 seconds (or even indefinitely) without any authorization having been received from the service provider, so long as there has been no report that use of the content was unauthorized. In another embodiment, the use of the content may be prevented until affirmative confirmation is received from the service provider that use of the content is authorized.

In one optional feature, where the mobile device receives an indication that use of the content is unauthorized, the mobile device may prevent more than a certain number of uses of the content. For example, if the use of the content is reported to be unauthorized, then the mobile device may indicate to the user that he will be permitted to access the content only five more times, or for one more week (to give two examples), before being prevented from any further use of the content. The notice may include an indication of how the user may purchase the content or otherwise register for authorized use of the content, effectively creating a "trial period" for use of the content.

V. An Exemplary Authentication Method: Service Provider Side

Figure 4:
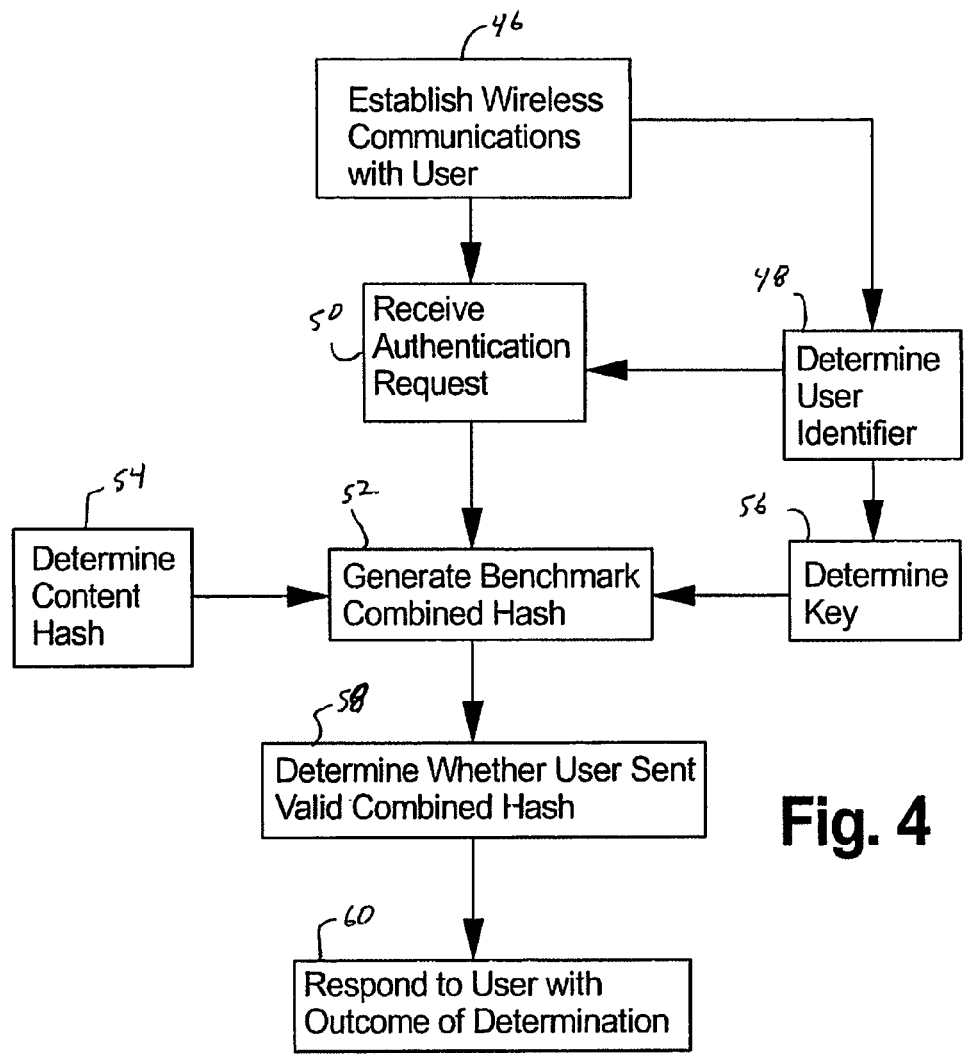
FIG. 4 is a flow diagram illustrating a method performed by a service provider in a digital rights management system.

A method performed by the service provider and/or authentication server is illustrated in FIG. 4. This method may be performed when, for example, a mobile device attempts to use content protected by the digital rights management system. The method illustrated in FIG. 4 may be, for example, performed by the service provider in conjunction with the method of FIG. 3, performed on a mobile device.

In step 46 of FIG. 4, the service provider establishes wireless communications with a user at a mobile device. As part of the establishment of communications, or in an additional step 48, the service provider determines a user identifier corresponding to the user. The mobile device sends an authentication request, which is received by the service provider in step 50. The authentication request includes a combined hash, such as that created in FIG. 2.

In step 52, the service provider generates a benchmark combined hash to compare with the combined hash received in the authentication request. The generation of the benchmark hash may be accomplished by, for example, the method of FIG. 2. As a part of determining the benchmark hash, the service provider may identify the content that is the subject of the authentication request and use that information in generating a content hash (step 54). As an alternative to generating the content hash, the service provider may make use of a database of pre-stored content hashes. As another part of determining the benchmark hash, the service provider may determine the service provider key (step 56). The service provider key may be the same for all users who communicate with the service provider, or it may be different for different users. In the latter case, the service provider key may be, for example, stored in a database of keys indexed by user identifier.

After the benchmark hash has been generated, the service provider compares the combined hash in the authentication request with the benchmark hash to determine whether the user has sent a valid combined hash (step 58). For example, the service provider can determine whether the combined hash is identical to the benchmark hash.

In an embodiment as described here, the benchmark hash is generated at least in part from information sent by the mobile device, such as the user identifier and/or an identifier of the protected content. This helps to limit the amount of information that is required to be stored at or retrieved by the service provider. In an alternative embodiment, however, the service provider need not generate a benchmark hash upon receiving information from the mobile device. Rather, the service provider may look up a benchmark hash that is already stored (at the service provider or elsewhere) and that is selected based on information from the authentication request, such as the user identifier and a content identifier.

After the service provider determines whether the user has sent a valid combined hash, the service provider reports on the outcome of that determination in step 60. The report may take a variety of forms. For example, the service provider may send a message to the user indicating whether or not the combined hash was valid. Alternatively, the service provider may send a message only if the hash is invalid, or (conversely) only if it is valid.

VI. Digital Rights Management System

Figure 5:
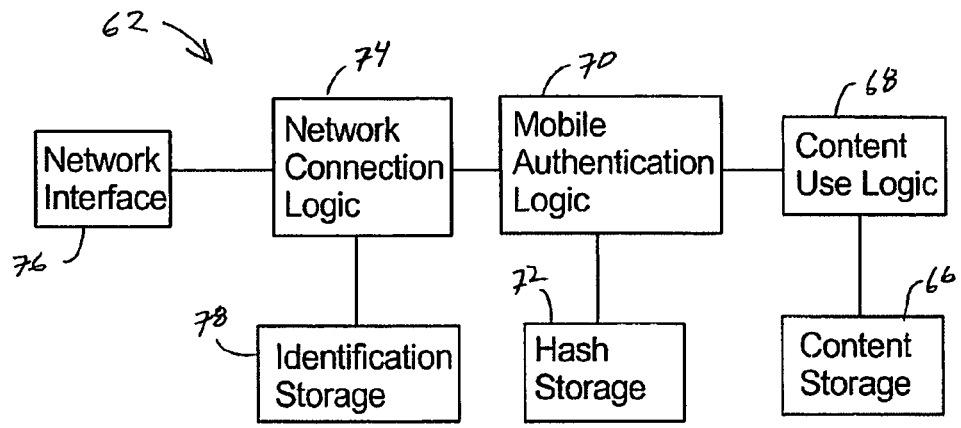
FIG. 5 illustrates the functional architecture of a mobile device for use with the digital rights management system.
Figure 6:
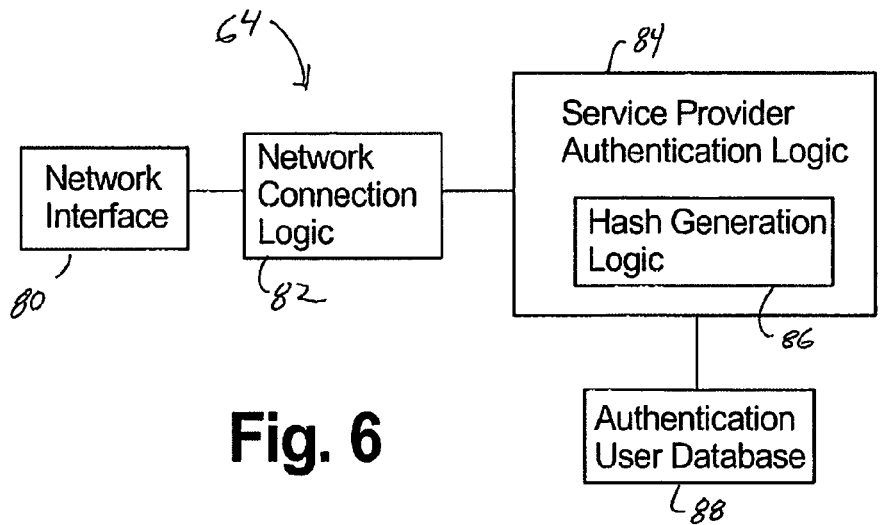
FIG. 6 illustrates the functional architecture of a service provider for use with the digital rights management system.

The functional architecture of an exemplary digital rights management system is illustrated in FIGS. 5 and 6. FIG. 5 illustrates a user's mobile station 62, while FIG. 6 illustrates a compatible service provider 64.

The mobile station includes content data storage 66 on which protected content (and optionally other non-protected content) is stored. The content in the content storage 66 is accessed through content use logic 68. The content use logic may be, for example, operating system software that operates on the mobile station. When an attempt is made to access content kept in the content storage 66, the content use logic determines whether that content is protected and, if so, engages mobile authentication logic 70 to determine whether the user is authorized to use the content.

The content use logic 68 may take various forms in different embodiments to accommodate different forms of digital content. For example, it may be operating system where the content is executable code, an interpreter and/or virtual machine where the content is interpreted code, or an audio and/or video player where the content is a media file.

The mobile authentication logic obtains the combined hash that will be sent to the service provider. As described with respect to FIG. 3, the combined hash may be pre-stored on the mobile device, or it may be generated when needed to authenticate protected content. If the combined hash is pre-stored, it can be kept in a hash storage 72. Hash storage 72 may include a collection of different combined hashes that correspond to different secured content. In an alternative embodiment, where a combined hash is generated only when needed, the hash storage 72 may store information used to generate the combined hash, such as a content hash (box 22 in FIG. 2).

The mobile device is further provided with network connection logic 74 and a network interface for establishing a wireless communications connection with a service provider. A user identifier is kept in an identification storage 78, and may be accessed by the network connection logic and/or the mobile authentication logic. The network connection logic and network interface are responsible for sending the combined hash to the service provider.

The various storage components described, such as the identification storage, the hash storage, and the content storage, may be implemented within a single memory device, or within multiple memory devices.

As illustrated in FIG. 6, the service provider likewise includes a network interface 80 and network connection logic 82, which receive any combined hash sent by the network interface. The service provider is equipped with service provider authentication logic 84, which is responsible for comparing a benchmark hash with the combined hash received from a mobile device. To this end, the service provider authentication logic is provided with hash generation logic 86, which is responsible for obtaining a benchmark hash.

The service provider authentication logic has at its disposal an authentication user database 88. For each user, the authentication user database may store information identifying the content that user is authorized to use, corresponding content hashes, service provider keys, and/or complete benchmark hashes. The service provider may itself be equipped with one or more authentication user databases 88, and/or the authentication user database may be maintained at a separate authentication server (such as the authentication server 14 of FIG. 1).

After the service provider authentication logic has determined whether the user has sent a valid hash, it reports the result of that determination through the network connection logic 82 and the network interface 80 to the user at the mobile device.

VI. Content Verification

The digital rights management system may optionally operate to determine whether the mobile device is running a valid (e.g., up-to-date, unmodified, and/or uncorrupted) version of the software. In an embodiment with this feature, the mobile authentication logic generates a local hash value of the content. This local content hash value can be checked by the mobile authentication logic and/or by the service provider. If the local hash does not correspond to a hash value of a valid version of the content, the authentication logic may prevent the content from being used.

VII. Alternative Embodiments

The systems and method described herein may be performed in hardware and/or in software. For example, the components of FIGS. 5 and 6 may be implemented by a processor executing software instructions stored on a computer storage medium. These instructions may direct the processor to perform the steps illustrated in FIGS. 3 and 4.

The embodiments described herein are provided as examples, and the scope of the invention is not limited to those examples, but rather is delineated by the following claims.

The invention claimed is:

1. A content management method, comprising:
receiving, from a mobile device, a combined hash associated with digital content;
determining a user identifier associated with the mobile device;
selecting a service provider key from among a plurality of service provider keys, the selection being made based on the user identifier, wherein the service provider key is the same for different user identifiers, and wherein the service provider key is unknown to a user of the mobile device;
generating a benchmark hash by hashing together at least the user identifier and the service provider key;
making a determination of whether the benchmark hash is the same as the combined hash;
if the determination is that the benchmark hash is the same as the combined hash, then, directly in response to the determination, reporting to the mobile device that the user is authorized to use the content; and
if the determination is that the benchmark hash is not the same as the combined hash, then, directly in response to the determination, reporting to the mobile device that the user is not authorized to use the content.

2. The method of claim 1, wherein generating the benchmark hash is performed after receiving the combined hash.

3. The method of claim 1, wherein determining the user identifier includes determining an electronic serial number.

4. The method of claim 1, wherein determining the user identifier includes determining a telephone exchange number.

5. A content management method, comprising:
receiving, from a mobile device, a combined hash associated with digital content;
generating a content hash from the digital content;
determining a user identifier associated with the mobile device;
selecting a service provider key from among a plurality of service provider keys, the selection being made based on the user identifier, wherein the service provider key is the same for different user identifiers, and wherein the service provider key is unknown to a user of the mobile device;
generating a benchmark hash by hashing together the user identifier, the service provider key, and the content hash;
making a determination of whether the benchmark hash is the same as the combined hash;
if the determination is that the benchmark hash is the same as the combined hash, then, directly in response to the determination, reporting to the mobile device that the user is authorized to use the content; and
if the determination is that the benchmark hash is not the same as the combined hash, then, directly in response to the determination, reporting to the mobile device that the user is not authorized to use the content.

6. A content management method, comprising:
receiving, from a mobile device, a combined hash associated with digital content;
determining a user identifier associated with the mobile device;
selecting a service provider key from among a plurality of service provider keys, the selection being made based on the user identifier, wherein the service provider key is the same for different user identifiers, and wherein the service provider key is unknown to a user of the mobile device;
generating a benchmark hash by hashing together the user identifier, the service provider key, and the digital content;
making a determination of whether the benchmark hash is the same as the combined hash;
if the determination is that the benchmark hash is the same as the combined hash, then, directly in response to the determination, reporting to the mobile device that the user is authorized to use the content; and
if the determination is that the benchmark hash is not the same as the combined hash, then, directly in response to the determination, reporting to the mobile device that the user is not authorized to use the content.

7. A content management method, comprising:
a service provider delivering digital content to a mobile device having an associated user identifier, the service provider including a network interface;
selecting a service provider key from among a plurality of service provider keys, the selection being made based on the user identifier, wherein the service provider key is the same for different user identifiers, and wherein the service provider is unknown to a user of the mobile device;
the service provider generating a combined hash based upon the (i) the digital content, (ii) the user identifier, and (iii) the service provider key, and the service provider delivering the generated combined hash to the mobile device;
the network interface subsequently receiving the combined hash from the mobile device as part of a request from the mobile device for authorization to use the digital content;
the service provider making a determination of whether the received combined hash is valid by carrying out a process comprising (i) determining the user identifier associated with the mobile device, (ii) generating a benchmark hash based upon the digital content, the determined user identifier, and the service provider key, and (iii) determining whether the received combined hash is the same as the benchmark hash;

if the determination is that the benchmark hash is the same as the combined hash, then, directly in response to the determination, the service provider reporting to the mobile device that the user is authorized to use the content; and if the determination is that the benchmark hash is not the same as the combined hash, then, directly in response to the determination, the service provider reporting to the mobile device that the user is not authorized to use the content.

8. A content management system, comprising:
a network interface;
network connection logic; and
service provider authentication logic,
wherein the network interface executes logic stored in a non-transitory computer readable medium to deliver to a mobile device having an associated user identifier (i) digital content and (ii) a combined hash generated based on the digital content, the user identifier, and a service provider key,
wherein the network interface further operates to receive from the mobile device, subsequent to the delivering, the combined hash as part of a request from the mobile device for authorization to use the digital content,
wherein the network connection logic operates to determine the user identifier, and
wherein the service provider authentication logic operates (i) to select the service provider key from among a plurality of service provider keys, the selection being made based on the user identifier, wherein the service provider key is the same for different user identifiers, and wherein the service provider key is unknown to a user of the mobile device, (ii) to generate a benchmark hash based upon the digital content, the determined user identifier, and the service provider key, (iii) to make a determination of whether the received combined hash is the same as the benchmark hash, (iv) if the determination is that the benchmark hash is the same as the combined hash, then, directly in response to the determination, to report to the mobile device via the network interface that the user is authorized to use the content, and (v) if the determination is that the benchmark hash is not the same as the combined hash, then, directly in response to the determination, to report to the mobile device via the network interface that the user is not authorized to use the content.

* * * * *